United States Patent [19]

Hansen

[11] 4,178,999
[45] Dec. 18, 1979

[54] REVERSIBLE TOOL MOUNTING BRACKET FOR AGRICULTURAL IMPLEMENTS

[76] Inventor: Elmer K. Hansen, 801 S. Martha, Sioux City, Iowa 51102

[21] Appl. No.: 838,744

[22] Filed: Oct. 3, 1977

[51] Int. Cl.² ............................................. A01B 23/02
[52] U.S. Cl. ................................. 172/702; 172/690; 172/763
[58] Field of Search ............... 172/734, 749, 750, 254, 172/763, 762, 707, 708, 702, 690, 693, 645, 656

[56] References Cited

U.S. PATENT DOCUMENTS

| | | | |
|---|---|---|---|
| 359,518 | 3/1887 | Pratt | 172/708 X |
| 402,000 | 4/1889 | Crane | 172/707 |
| 481,946 | 9/1892 | Herrington | 172/645 |
| 2,259,890 | 10/1941 | Hipple | 172/707 X |
| 2,490,237 | 12/1949 | Silver | 172/707 X |
| 2,884,081 | 4/1959 | Weber | 172/656 X |

Primary Examiner—Richard J. Johnson
Attorney, Agent, or Firm—Rudolph L. Lowell; G. Brian Pingel

[57] ABSTRACT

A reversible mounting bracket for releasably securing a tool to the tool bar of a soil tilling farm implement so that the tool may be readily removed or replaced when desired. The mounting bracket has a base plate adapted to be rigidly attached to the underside of the tool bar by U-bolts. A pair of transversely spaced longitudinally extended upright tool support arms are fixed to the lower surface of the base plate so as to extend in a direction parallel to the direction of travel of the implement. Disposed along the lower portions of each pair of support arms is a tubular socket that is open at the forward and rear end thereof so that the shank portion of the tool may be inserted through either end for securement in the socket by a pin connection.

6 Claims, 7 Drawing Figures

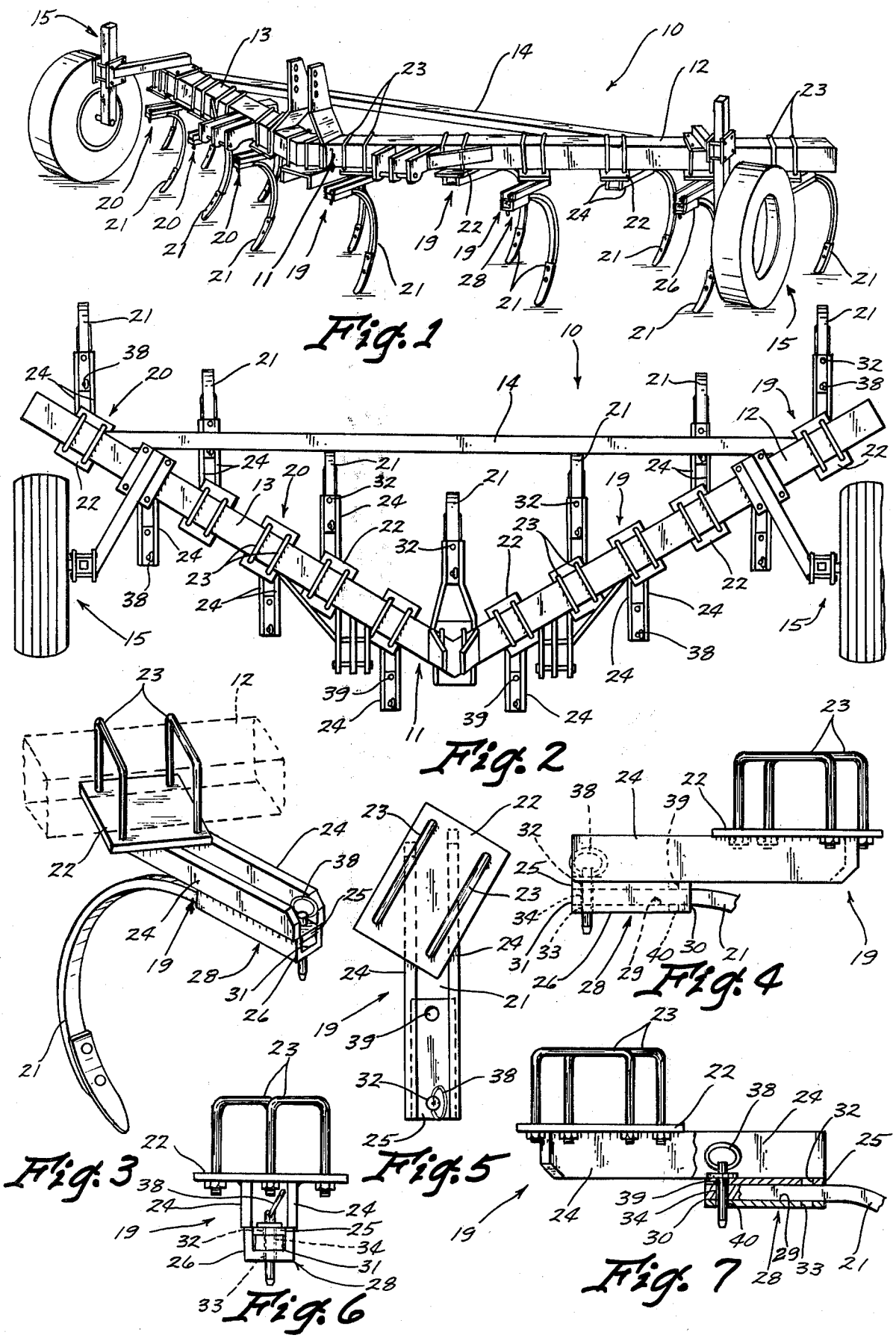

REVERSIBLE TOOL MOUNTING BRACKET FOR AGRICULTURAL IMPLEMENTS

SUMMARY OF THE INVENTION

The present invention provides a reversible mounting bracket that is adapted to releasably secure a tool to a tool bar of a farm implement, and includes a base plate, an elongated tool support means fixed to the lower surface of the base plate to protrude outwardly therefrom, coupling means for attaching the base plate to the tool bar so that the tool support means extends longitudinally in a direction parallel to the direction of travel of the farm implement, tubular socket means on the tool support means, either end of which is adapted to receive the shank portion of the tool, and retention means for securing the tool in the socket means.

In each of the preferred embodiments of the present invention, the tool support means is in the form of two rectangularly shaped arms fixed lengthwise to the bottom surface of the base plate and disposed in a parallel relationship to one another for supporting the socket means in a position remote from the tool bar. Thus, there is easy access to the retention means that secures the shank of the tool in the socket means. This permits the ready removal of a tool from the socket means for replacement or exchange for another type tool. The mounting bracket is designed to be attached to the tool bar with the support arms projected either forwardly or rearwardly thereof. By attaching the mounting brackets to the tool bar with the tool support arms of adjacent brackets projected in opposite directions the spacing between the tools may be varied to accommodate different soil and working conditions.

DESCRIPTION OF THE DRAWINGS

FIG. 1 is a perspective view of a cultivator having a tool bar shown in assembly relation with a plurality of mounting brackets of the present invention for interconnecting tools to the bar;

FIG. 2 is a plan view of the cultivator assembly of FIG. 1;

FIG. 3 is an enlarged perspective view showing one of the mounting brackets secured to a segment of the cultivator tool bar, which is indicated in dashed lines;

FIG. 4 is an enlarged side view of one of the mounting brackets of FIG. 1 showing a fragmentary upper portion of a tool disposed through one end of a socket means which forms part of the mounting bracket;

FIG. 5 is a plan view of the mounting bracket of FIG. 4;

FIG. 6 is a front view of the mounting bracket of FIG. 4; and

FIG. 7 is a reversed side view of the mounting bracket of FIG. 4 showing the fragmentary portion of the tool disposed through the opposite end of the socket means.

DETAILED DESCRIPTION OF THE PREFERRED EMBODIMENTS

Two preferred embodiments of the present invention will now be described with reference to the drawings, wherein FIGS. 1 and 2 show a cultivator 10 having a tool bar 11 of V-shape in plan view formed substantially of a two piece construction that includes elongated right and left legs 12 and 13, respectively. A brace member 14 is connected to the free ends of the legs 12 and 13 for purposes of strength and rigidity. The tool bar 11 is supported off the ground by running gear 15, and may be attached to the three point hitch of a usual farm tractor.

A plurality of mounting brackets 19 and 20, representing preferred embodiments of the present invention, are rigidly attached on the tool bar legs 12 and 13, respectively, for supporting tools 21 for cultivating. However, it should be understood that the mounting brackets 19 and 20 are not limited to employment on the cultivator 10, but may instead be employed on a wide variety of ground tilling implements requiring securement of various types of tools to a tool bar.

The individual elements of the brackets 19 are identical to their respective counterparts forming the brackets 20. Accordingly, the brackets 19 and 20 differ from one another only in the manner in which the elements of each thereof are assembled. Because such differences of assembly are relatively minor, the basic construction of the present invention will be described only with reference to the brackets 19.

Referring now to FIG. 3, each of the mounting brackets 19 has a base plate 22 adapted to be attached to the underside of the tool bar leg 12 preferably by a pair of U-bolts 23 that serve as rigid coupling means interconnecting the base plate 22 and the leg 12. The base plate 22 is shown as being of a rectangular shape, but such shape may be varied.

As best shown in FIGS. 4–7, a pair of rectangularly shaped longitudinally extended upright arms 24 are secured along their upper edges to the lower surface of the base plate 22 and project outwardly at an angle thereto such that the longitudinal axes of the arms 24 are parallel to the advance movement of the cultivator 10 during a tilling operation. It is preferable to employ two arms 24 to insure a strong supporting structure but in certain instances, the use of a single arm 24 may be sufficient.

A connecting plate 25 is secured along the bottom edges of the projected portions of the arms 24. As best seen in FIGS. 3 and 6, a channel shaped tool guide 26 is fixed to the bottom portion of the connecting plate 25 to form a tubular socket means 28 of a rectangular shape in transverse cross section having a longitudinal axis parallel to the arms 24. A bore 29 of the socket means 28 is of a size to telescopically receive the upper portion of the shank of a tool 21 through either end opening 30 or 31 thereof.

Referring now to FIG. 4, a first set of aligned apertures 32 and 33 is formed through the socket means 28 near one end thereof. The shank portion of each of the tools 21 has a linear upper end portion in which is formed an aperture 34 so a tool 21 received through the opening 30 into the socket means 28 is secured thereto by placing a connecting pin 38 or other such retention means into the apertures 32–34.

A second set of aligned apertures 39 and 40 is also formed through the socket means 28 but at an end opposite to that in which the apertures 32 and 33 are formed. The apertures 39 and 40 are employed in pinning the shank of one of the tools 21 inserted into the socket means 28 via the opening 31, as shown in FIG. 7. Placement of the pin 38 into either set of apertures 32, 33, or 39, 40 can be readily accomplished because the arms 24 serve as a tool support means for positioning the socket means 28 in a location remote from the bottom of the tool bar 11. Thus, there is no frame structure that interferes with the insertion or removal of the pin 38. For this reason the tools 21 can be speedily secured to or removed from the mounting bracket 19.

The purpose for having the tools 21 insertable into either end of the socket means 28 is to provide for a reversible mounting of the brackets 19 on the tool bar leg 12 such that the arms 24 project either forwardly or backwardly thereof. As a result, the brackets 19 can be selectively arranged as indicated by FIGS. 1 and 2, wherein adjacent brackets 19 are disposed with their arms 24 oppositely directed. Such an arrangement provides for a wider spacing between the tools 21 of adjacent brackets to insure that lumps of soil will not be wedged therebetween.

Thus, the present invention, as represented by the bracket embodiment 19, provides a number of important operating advantages. It should also be noted that the unique construction of the brackets 19 and 20 provides for their assembly from like parts. Accordingly, it is seen that the brackets 20 each have the base plate 22, U-bolts 23, arms 24 and socket means 28. The only way in which the brackets 20 are different from the brackets 19 is the manner in which the arms 24 of the brackets 19 and 20 project outwardly from the base plate 22.

As shown in FIG. 2, the arms 24 of the brackets 20 project rearwardly from the left rear corners of the base plates 22 and forwardly from the right front corners thereof. In contrast, the arms 24 of the brackets 19 extend rearwardly from the left front corners thereof. This alignment is necessary to position the arms 24 of the brackets 19 and 20 in a direction parallel to the direction of travel of the cultivator 11.

With respect to the specific angles of the preferred embodiment that provide the above alignments, the tool bar legs 12 and 13 form a 120° angle with one another, the forwardly projected arms 24 of the brackets 19 and 20 form 120° angles with the legs 12 and 13, respectively.

Although the invention has been described in connection with two preferred embodiments thereof, it is to be understood that it is not to be so limited since changes and modifications can be made therein which are within the full intended scope of the invention as defined by the appended claims.

I claim:

1. A reversible mounting bracket for releasably securing a tool having a shank portion to the leg sections of a forwardly facing V-shaped tool bar of a farm implement for tilling soil, said mounting bracket comprising:
   (a) a base plate with upper and lower surfaces,
   (b) elongated tool mounting means fixed to and extended longitudinally of the lower surface of said base plate and having a tool supporting end portion projected outwardly therefrom,
   (c) coupling means for attaching said base plate against the under surface of one of said tool bar leg sections such that in one position the projected end portion is located to the front of said tool bar leg section and in a reversed position is located to the rear of said tool bar leg section with the longitudinal axis of said tool mounting means directed parallel to the direction of travel of said farm implement,
   (d) socket means fixed along the lower portion of the projected end portion of said tool mounting means and open at both ends to receive said shank portion through either end thereof, and
   (e) retention means for releasably securing the shank portion of said tool in said socket means.

2. The reversible mounting bracket as recited in claim 1, wherein:
   (a) the longitudinal axis of said socket means is parallel to that of said tool mounting means.

3. The reversible mounting bracket as recited in claim 1, wherein:
   (a) said tool mounting means is comprised of a pair of transversely spaced, upright arms.

4. The reversible mounting bracket as recited in claim 3, wherein:
   (a) said socket means is comprised of a connecting plate secured to the projecting portions of said tool mounting arms and a channel shaped tool guide fixed to the bottom portion of said connecting plate.

5. A reversible mounting bracket for releasably securing a tool, having a shank portion to a tool bar of a farm implement for tilling soil, said mounting bracket comprising:
   (a) a base plate with upper and lower surfaces,
   (b) elongated tool mounting means fixed to and extended longitudinally of the lower surface of said base plate and having a tool supporting end portion projecting outwardly from one end of said base plate, said tool mounting means comprised of a pair of transversely spaced longitudinally extended upright arms,
   (c) coupling means for attaching said base plate against the under surface of said tool bar such that in one position the projected end portion is located to the front of the tool bar and in a reversed position is located to the rear of the tool bar with the longitudinal axis of said tool mounting means directed parallel to the direction of travel of said farm implement,
   (d) socket means fixed along the lower portion of the projected end portion of said tool mounting means and open at both ends to telescopically receive said shank portion through either end thereof, said socket means including:
      (1) a connecting plate secured to the projected end portion of said tool mounting means,
      (2) a channel shaped tool guide fixed to the bottom portion of said connecting plate,
      (3) said socket means having aligned apertures formed therethrough, and
      (4) a connecting pin extendible through said aligned apertures to the shank portion of said tool within said socket means.

6. The reversible mounting bracket as recited in claim 5, wherein:
   (a) said coupling means is comprised of at least one U-bolt.

* * * * *